United States Patent
Ferrari-Philippe et al.

(10) Patent No.: US 6,503,546 B1
(45) Date of Patent: Jan. 7, 2003

(54) CRISP FILLED PASTRY AFTER MICROWAVE BAKING

(75) Inventors: Fabiana Ferrari-Philippe, Beauvais (FR); Jean-Francois Tharrault, Coincourt (FR)

(73) Assignee: Nestec S.A., Vevey (CH)

( * ) Notice: Subject to any disclaimer, the term of this patent is extended or adjusted under 35 U.S.C. 154(b) by 0 days.

(21) Appl. No.: 09/575,711

(22) Filed: Jul. 26, 2000

Related U.S. Application Data

(63) Continuation of application No. PCT/EP98/08566, filed on Dec. 28, 1998.

(30) Foreign Application Priority Data

Jan. 26, 1998 (EP) ............................................. 98101262

(51) Int. Cl.$^7$ ............................................. A21D 13/00
(52) U.S. Cl. ..................... 426/94; 426/99; 426/237; 426/283; 426/496
(58) Field of Search ..................... 426/94, 549, 496, 426/130, 283, 284, 237, 99

(56) References Cited

U.S. PATENT DOCUMENTS

| | | | | |
|---|---|---|---|---|
| 4,401,681 A | * | 8/1983 | Dahle | 426/94 |
| 4,783,338 A | * | 11/1988 | Hayashi | 426/94 |
| 4,935,251 A | * | 6/1990 | Verhoef et al. | 426/94 |
| 5,069,916 A | | 12/1991 | Buckholz et al. | 426/243 |
| 5,118,514 A | * | 6/1992 | Adams et al. | 426/94 |
| 5,145,699 A | * | 9/1992 | Dijkshoorn et al. | 426/94 |
| 5,192,568 A | * | 3/1993 | Yokoyama et al. | 426/94 |
| 5,401,518 A | * | 3/1995 | Adams et al. | 426/89 |
| 5,520,937 A | * | 5/1996 | Yasosky et al. | 426/94 |
| 5,756,137 A | * | 5/1998 | Viviano et al. | 426/94 |
| 5,945,022 A | | 8/1999 | Volpe et al. | 219/407 |
| 6,039,988 A | * | 3/2000 | Monte | 426/94 |
| 6,139,885 A | * | 10/2000 | Jouanneau et al. | 426/94 |

FOREIGN PATENT DOCUMENTS

| | | |
|---|---|---|
| EP | 0 509 566 | 10/1992 |
| GB | 698762 | 10/1953 |
| WO | WO 96/11577 | 4/1996 |

* cited by examiner

*Primary Examiner*—Lien Tran
(74) *Attorney, Agent, or Firm*—Winston & Strawn

(57) ABSTRACT

A filled pastry that can be baked in a microwave to achieve a baked pastry-like taste and a crisp final texture is described. The pastry mixture includes flour, a first fat, water, yeast, emulsifier, pentosanase, and amino acids. A liquid filling with a high water content is trapped in the pastry by a moisture barrier placed in contact therewith. The moisture barrier contains from about 80 to about 98 percent fat, from about 7 percent to about 13 percent of a film-forming protein, and from about 0.7 to about 1.3 percent of a hydrocolloid. The fat may includes medium-chain triglycerides whose melting point is between 20° C. and 35° C. The film-forming protein may be calcium or sodium caseinate. The hydrocolloid may be an iota-type carrageenan. This moisture barrier mixture is disposed between the filling and the pastry in an amount of about 1 to about 15 g/100 cm$^2$.

20 Claims, No Drawings

CRISP FILLED PASTRY AFTER MICROWAVE BAKING

CROSS-REFERENCE TO RELATED APPLICATIONS

Referenced-applications

This application is a continuation of the U.S. National Stage of International Application No. PCT/EP98/08566, filed Dec. 28, 1998, the content of which is expressly incorporated herein by reference thereto.

STATEMENT REGARDING FEDERALLY SPONSORED RESEARCH

Not Applicable

REFERENCE TO A MICROFICHE APPENDIX

Not Applicable

FIELD OF THE INVENTION

The subject of the present invention is a deep-frozen filled pastry which becomes crisp after microwave baking.

BACKGROUND OF THE INVENTION

The crisp products which are currently on the market are based on prebaked pastries. These prebaked pastries are normally heated in a microwave. The crispness of these products is entirely due to the presence of susceptors which create temperatures of about 200° C. in contact with the product and thus allow drying of the surface.

The baking of raw filled pastries in a microwave is delicate because the baking time is short and the filling rapidly arrives at high temperatures. In addition, the distribution of the microwaves is heterogeneous. Maillard reactions are very weak and therefore pastries cooked with microwaves have a raw flour-like taste and do not brown.

To improve external browning of these filled pastries during microwave baking, it is possible to use mechanical or chemical susceptors. U.S. Pat. No. 5,069,916 describes a process for browning a pastry using, as susceptor, a solvent such as a pure mixture or a mixture in water of polyethylene glycol or of glycerine and emulsifiers.

WO-A-96 11577 describes food products consisting of a filled or topped pastry comprising a barrier layer which comprises less than 5 percent of water and oil and at least one water-binding agent. The barrier layer, which contains no film-forming protein, serves to limit the exchange of water between the filling and the baked pastry and to thus improve the stability of the baked pastry during heating in a microwave.

EP-A-0,509,566 describes a composite pastry product comprising a layer of puff pastry and an edible water barrier layer. The barrier layer is based on fat and contains no film-forming protein. Furthermore, in this case, as in the case of WO-A-96 11577, the pastry is baked in a traditional oven (Example 1, p. 3, line 29; Example 2 is a repetition of Example 1; Example 3, page 4, line 20; Examples 4 & 5 are repetitions of Example 1). The transfer of the pastry to a microwave oven is, as in the preceding case, to defrost and/or heat (page 3, lines 44 to 47), but not to bake.

GB-A-698,762 relates to a method intended to protect raw pastry products against problems of impregnation of the pastry during long storage in the crude state in the presence of a filling containing a high water content via the interposition of a fat-based barrier layer. The composition of the barrier layer described consists of a fatty substance which is solid at the storage temperatures by virtue of a high melting point. The barrier layer may contain hydrocolloids, but there is no mention of a film-forming protein.

Only the use of a susceptor-type packaging containing, for example, a light aluminium foil can the temperatures rise to 200° C. in microwave ovens, thus promoting the coloring and the baking of the surface of the pastry which is in contact therewith. A slight crispness is thereby obtained. However, when the shape of the product does not allow adequate contact with the susceptor during baking, the crispness of the pastry as well as the baked pastry-like taste can not be satisfactorily obtained by these processes.

These pastries also have the disadvantage of not being able to contain fillings whose temperature increases very rapidly and escape from the pastry through boiling. An increase in the water content of the filling, to allow a longer baking time for the pastry, has several undesirable consequences including the migration of water from the filling to the pastry, thus modifying and impairing the organoleptic qualities and the texture of the pastry.

The present invention proposes to remedy these disadvantages.

SUMMARY OF THE INVENTION

In the filled pastry according to the present invention, a liquid filling with a high water content is trapped in the pastry by a moisture barrier placed in contact therewith.

Exemplary non-filled pastry is a mixture of flour, fat, and water. Advantageously the mixture includes yeast, emulsifier, pentosanase, amino acids. In some embodiments the mixture may contain sugar, lactose, and/or whey.

The moisture barrier mixture advantageously contains from about 80 to about 98 percent fat, from about 7 percent to about 13 percent of a film-forming protein, and from about 0.7 to about 1.3 percent of a hydrocolloid. The fat advantageously includes medium-chain triglycerides whose melting point is between 20° C. and 35° C. The film-forming protein is preferably a calcium or sodium caseinate. The hydrocolloid may be an iota-type carrageenan. This moisture barrier mixture is disposed between the filling and the pastry in an amount of about 1 to about 15 g/100 cm$^2$ and preferably between about 4 and about 8 g/100 cm$^2$.

Such a barrier allows the use of a savory filling whose water content can reach about 85 percent. The resulting pastry product has a baked pastry-like taste and a crisp final texture after microwave baking. The crisp pastry according to the invention allows, in addition, a more rapid baking in a microwave.

The use of a susceptor is not necessary on the top part of the product. The desired color can be optionally obtained by other methods, for example incorporating a tea-based color in order to obtain the usual appearance.

BRIEF DESCRIPTION OF THE SEVERAL VIEWS OF THE DRAWINGS

Not Applicable

DETAILED DESCRIPTION OF THE INVENTION

To prepare a pastry in accordance with the invention, a non-filled pastry is prepared. Advantageously, the non-filled pastry comprises a mixture of flour, yeast, emulsifier, pentosanase, amino acids, fat and water.

The flour should be preferably chosen so that the absorption of water is as reduced as possible, but allowing nevertheless good extensibility of the pastry. This makes it possible to reduce the quantity of water contained in the pastry. The flour is preferably biscuit flour. Bread flour can also be used. The quantity of flour added may be between about 40 percent and about 60 percent, and preferably between about 50 percent and 55 percent, by weight relative to the weight of the total mixture.

The deactivated or activated yeast may be added to the mixture. Through its action on the disulphide bridges of the gluten, the yeast makes it possible to considerably increase the extensibility of the pastry and to reduce shrinkage during shaping. It makes it possible, in addition, to reduce the addition of water to the pastry, without damaging its malleability. Finally, the deactivated yeast also improves the crispness of the pastry after microwave baking by allowing better drying and by reducing the typical rubbery texture of pastries baked in a microwave. The yeast may be added to the mixture in proportions which vary according to the type of flour used. The use of bread flour requires a larger quantity of yeast than that required for the use of a biscuit flour whose gluten network is already less elastic. The proportion of deactivated yeast can reach about 0.04 percent by weight of the mixture.

The emulsifier may be chosen from lecithins or fatty acid esters, for example sodium stearyl lactilate. Preferably the emulsifier is selected from fatty acid esters of polyglycerol, in particular decaglycerol ester which has a melting point of less than −15° C. These emulsifiers are incorporated preferably directly into the pastry. These emulsifiers make it possible to increase the rate of baking of the pastry in a microwave and, in addition, improves the pastry dough extensibility and reduces the elasticity thereof. The mechanical treatment of the pastry is thereby considerably improved.

The emulsifier may be incorporated directly into the pastry in an amount of between about 0.05 percent to about 0.3 percent by weight relative to the weight of the pastry, and preferably in proportions of between about 0.1 percent and about 0.2 percent.

The addition of a pentosanase, which solublizes the pentosans in the flour, to the mixture makes it possible to reduce its absorptive power and to thus reduce the quantity of water to be evaporated during baking, while preserving the good malleability of the pastry. This enzyme may be added in proportions of up to about 1.5 g per 10 kg of pastry. Pentosanase also allows a slight increase in the Maillard reactions when the pastry is heated.

Amino acids may also be added to the mixture. They may be obtained by enzymatic hydrolysis of wheat gluten, for example, or are pure amino acids such as proline. The amino acids can play the role of precursor of baked taste and of browning; they make it possible, in addition, to accelerate the baking of the pastry. Their proportions may be between about 0.1 and about 0.3 g per kg of pastry, preferably about 0.2 g/kg of pastry.

Sugars may also be added to the pastry in the form of xylose, dextrose, fructose and/or lactose, in this order of preference. The addition of sugars also makes it possible to enhance the browning reaction and to reduce the pastry shrinking effect. Lactose may be provided in the form of milk powder or of whey. The presence of whey proteins also makes it possible to enhance the extensibility of the pastry and to increase the final crispness of the crust.

The quantity of sugar added to the mixture can reach about 3 percent by weight of the final mixture and is preferably between about 1 percent and about 2 percent.

The fat, normally used for the proportion of such pastries, can be partially replaced with oil having a melting point of less than about −15° C. The addition of such an oil may represent up to about 40 percent of the quantity of added fat, preferably up to about 20 percent. Polyunsaturated oils, and more particularly rapeseed oil, are preferred oils. The relatively low melting point of these oils allows them to rise very rapidly to temperatures greater than 180° C. during microwave heating.

To carry out the invention, the quantity of fat added to the mixture is preferably between about 20 percent and about 40 percent. The fat is advantageously incorporated in a heterogeneous manner so as to create fine layers of fat of a few microns in the pastry. The fat used to obtain these layers is preferably chosen with the same consistency as the pastry. These layers of fat serve as barrier to the vapor inside the pastry; they allow extension of the pastry and facilitate the evacuation of vapor to the outside. This puff pastry type process contributes to the crisp character of the product, by virtue of the fineness of several layers constituting the microwave baked pastry.

According to a specific feature of the invention, with the aim of allowing the crispness of the pastry after microwave baking, a layer of a mixture which plays the role of a moisture barrier is placed at the surface of the liquid filling.

This moisture barrier mixture may be either at the bottom of the pastry, or at the surface of the liquid filling, in an amount of about 1 to about 15 g/100 cm$^2$ and preferably between about 4 and about 8 g/100 cm$^2$.

The said mixture may contain the fat and more particularly medium-chain triglycerides whose melting point is between 20° C. and 35° C. The fat may be of the same nature as the fat previously used in the sheeting part.

The fat is mixed in the molten state with a hydrocolloid, which acts as a moisture retaining agent, and with a film-forming protein, which with the fat forms a moisture barrier. The proportions of fat in this "barrier" mixture may vary from about 80 to about 98 percent, the film-forming protein from about 7 to about 13 percent and the hydrocolloid from about 0.7 to about 1.3 percent. The film-forming protein is preferably a calcium or sodium caseinate. The hydrocolloid may be an iota-type carrageenan, for example.

In addition to the barrier effect, that is, preventing migration of water from filling, during the deep-frozen storage and the microwave heating, this fat-rich composition also rises to high temperatures during microwave heating, thereby helping bake the inner layer of the pastry. This barrier layer also reduces the impact of the microwaves on the filling.

The filled pastry is prepared by a traditional process. After kneading of the various ingredients of the mixture, the pastry is laminated or given a base and then filled. The product is advantageously prepared in a mold, optionally with a susceptor film. The filling is advantageously deposited between the pastry after a deep freezing stage, which makes it possible to control the shape of the product and to avoid an excessively heterogeneous distribution of the waves.

The filling contained in the pastry will be preferably savory, with a high mineral salt content of between about 2 percent and about 5 percent. Its water content can reach 85 percent. Such a composition will have a fairly slow rate of heating that will make it possible to avoid boiling phenomena before the baking of the pastry.

It is possible to prepare several sorts of filling and in particular a reduced-fat filling containing less than 1 percent of fat and about 7 percent of protein. Meat pieces and vegetables may be dispersed therein.

The filled pastry according to the invention is preferably deep frozen at the end of the preparation, and then packaged. Its baking is carried out in a microwave at maximum power for 2 to 3 minutes for 100 g of product depending on the oven power and the shape of the product.
[Section] [s1]

EXAMPLES

The examples described below are not limiting and serve to illustrate the invention. The percentages and parts are indicated by weight.
[Section] [s2]

EXAMPLE 1

A mixture containing 60 percent of biscuit flour, 0.6 percent of fine salt, 0.1 percent of deactivated dry yeast, 0.72 percent of dextrose, 1.2 percent of whey powder, 0.18 percent of decaglycerol ester, 13.2 percent of fat, 2.7 percent of refined rapeseed oil, 18.5 percent of water, and 0.01 percent of proline was kneaded and then laminated to a thickness of about 3 mm and deposited in a pie mold of the susceptor type. The bottom was sprayed with the "barrier" layer and a liquid filling of the béchamel type with vegetable and/or meat inclusions was then deposited. The sauce:inclusion ratio was about 50:50. The composition of the béchamel was the following: 74 percent of water, 12 percent of créme fraiche, 5.5 percent of starch and flour, 4 percent of fat, 2.5 percent of salts and spices and 2 percent of powdered milk. The water content of the béchamel sauce was 81 percent.

The surface of the béchamel sauce was sprayed with the "barrier", and then the pastry cover was deposited on. The "barrier" was composed of a mixture of 267 g of fat in the form of lard, 30 g of calcium caseinate and 3 g of carrageenan.

The filled pastry which weighs 450 g was then deep frozen. After baking in a microwave for 10 minutes, the pastry becomes crisp.
[Section] [s3]

EXAMPLE 2

A pastry was prepared which contains 49 percent of flour, 0.6 percent of deactivated yeast, 0.6 percent of powdered whey, 0.8 percent of salt, 0.2 percent of dextrose, 0.01 percent of proline, 22.7 percent of water, 26 percent of puff pastry margarine, 0.1 percent of decaglycerol, and 0.02 percent of pentosanase. The filling is composed of 18 percent of minced meat, 6 percent of water, 0.9 percent of binder, 46 percent of tomato sauce, 21.5 percent of vegetables and herbs, 2 percent of powdered white wine, 1.5 percent of salt, and 0.3 percent of spices. The water content of the filling is 80 percent.

The pastry is prepared and deep frozen at a thickness of 10 mm in round molds. The filling is then deposited between the pieces of rolled out pastry previously sprayed with the above-described "barrier" layer.

A tea-based glaze is deposited on the top part of the pastry. This glaze has the following composition: 50 percent of water, 4 percent of powdered tea, 44 percent of sunflower oil and 2 percent of xanthan gum. The filled pastry is then deep frozen. The baking of this 100 g filled pastry in a microwave lasts for 2 to 2.5 minutes.

While the foregoing description represents preferred embodiments of the present invention, it will be understood that various additions and/or substitutions may be made therein without departing from the spirit and scope of the present invention. One skilled in the art will appreciate that the invention may be used with many modifications of structure, forms, arrangement, proportions, and materials used in the practice of the invention and which are particularly adapted to specific products and operative requirements, without departing from the principles of the present invention. The presently disclosed embodiments are therefore to be considered in all respects as illustrative and not restrictive.

DEPOSIT OF COMPUTER PROGRAM LISTINGS

Not Applicable

What is claimed is:

1. A filled pastry product comprising:
    a raw, unbaked pastry dough comprising:
        from about 40 percent to about 60 percent of flour;
        from about 20 percent to about 40 percent of a first fat; and
        from about 10 percent to about 25 percent of water;
    a filling with a water content of 80 to about 85 percent by weight to provide a rate of heating slow enough to inhibit or avoid boiling of the filling; and
    a moisture barrier comprising from about 80 percent to 98 percent of a second fat, a film-forming protein, and a hydrocolloid,
    wherein the product is to be baked entirely in a microwave and the moisture barrier is disposed between the filling and the pastry dough and the moisture barrier substantially prevents moisture from the filling from contacting the pastry during microwave cooking, thereby allowing the pastry to become crisp during microwave baking.

2. The filled pastry product of claim 1 where-fin the pastry dough further comprises one or more of deactivated yeast, an emulsifier, a pentosanase and amino acids.

3. The filled pastry product of claim 1 wherein the pastry dough further comprises up to about 0.04 percent of yeast, from about 0.05 percent to about 0.3 percent of emulsifier, up to about 0.015 percent of pentosanase, and from about 0.01 to about 0.03 percent of amino acids.

4. The filled pastry product of claim 3 wherein the pastry dough comprises from about 0.1 percent to about 0.2 percent of emulsifier, and about 0.02 percent of amino acids.

5. The filled pastry product of claim 2 wherein the emulsifier is chosen from the group consisting of lecithins and fatty acid esters.

6. The filled pastry product of claim 2 wherein the emulsifier comprises fatty acid esters of polyglycerol.

7. The filled pastry product of claim 2 wherein the emulsifier comprises decaglycerol ester, and wherein the emulsifier is incorporated directly into the pastry dough in proportions of between 0.1 percent and 0.3 percent relative to the total weight of the pastry dough.

8. The filled pastry product of claim 1 wherein the first fat comprises up to about 40 percent oil having a melting point of less than −15° C.

9. The filled pastry product of claim 8 wherein the oil is rapeseed oil.

10. A filled pastry product comprising:
    a raw, unbaked pastry dough comprising:
        from about 40 percent to about 60 percent of flour;
        from about 20 percent to about 40 percent of a first fat; and
        from about 10 percent to about 25 percent of water;
    a filling with a water content of 80 to about 85 percent by weight to provide a rate of heating slow enough to inhibit or avoid boiling of the filling; and a moisture barrier comprising a second fat, a film-forming protein, and a hydrocolloid, wherein product is to be baked entirely in a microwave and the moisture barrier (a) comprises from about 80 percent to 98 percent of the second fat, from about 7 percent to about 13 percent of the film forming protein, and from about 0.7 to 1.3 percent of the hydrocolloid, and (b) is disposed between the filling and the pastry dough so that it substantially prevents moisture from the filling from contacting the pastry during microwave cooking, thereby allowing the pastry to become crisp during microwave baking.

11. The filled pastry product of claim 10 wherein the film-forming protein comprises sodium caseinate, calcium caseinate, or a mixture thereof, and wherein the hydrocolloid is a carrageenan.

12. The filled pastry product of claim 10 wherein the second fat comprises triglycerides having a melting point between about 20° C. and about 35° C.

13. The filled pastry product of claim 10 wherein the moisture barrier mixture is present in an amount of about 0.01 to about 0.15 grams per square centimeter.

14. The filled pastry product of claim 10 wherein the moisture barrier mixture is present in an amount of about 0.04 to about 0.08 grams per square centimeter.

15. The filled pastry product of claim 1 further comprising a tea-based glaze comprising water, tea solids, oil, and a gum deposited on the top part of the pastry.

16. The filled pastry product of claim 1 provided in a deep-frozen form.

17. A filled pastry product comprising a raw, unbaked pastry dough comprising:
   from about 40 percent to about 60 percent of flour,
   from about 20 percent to about 40 percent of a first fat,
   from about 10 percent to about 25 percent of water,
   yeast in an amount up to about 0.04 percent,
   from about 0.05 percent to about 0.3 percent of emulsifier,
   pentosanase in an amount up to about 0.015 percent, and
   from about 0.01 to about 0.03 percent of amino acids;

a filling with a water content of 80 to about 85 percent by weight to provide a rate of heating slow enough to inhibit or avoid boiling of the filling; and a moisture barrier comprising
   from about 80 percent to about 98 percent of a second fat,
   from about 7 percent to about 13 percent of a film-forming protein, and
   from about 0.7 percent to about 1.3 percent of a hydrocolloid;

wherein the product is to be baked entirely in a microwave and the moisture barrier is disposed between the filling and the pastry dough and the moisture barrier substantially prevents moisture from the filling from contacting the pastry during microwave cooking, thereby allowing the pastry to become crisp during microwave baking.

18. The filled pastry product of claim 17 wherein the first fat comprises up to about 40 percent oil having a melting point of less than −15° C., the emulsifier is chosen from the group consisting of lecithins and fatty acid esters, the second fat comprises triglycerides having a melting point between about 20° C. and about 35° C., the film-forming protein comprises sodium caseinate, calcium caseinate, or a mixture thereof, and the hydrocolloid is a carrageenan, and wherein the moisture barrier mixture is present in an amount of about 0.01 to about 0.15 grams per square centimeter.

19. The filled pastry product of claim 18 wherein the oil is rapeseed oil, the emulsifier comprises fatty acid esters of polyglycerol, and the moisture barrier mixture is present in an amount of about 0.64 to about 0.08 grams per square centimeter.

20. The filled pastry product of claim 1, wherein the filling comprises about 2% to 5% of a mineral salt.

* * * * *

UNITED STATES PATENT AND TRADEMARK OFFICE
CERTIFICATE OF CORRECTION

PATENT NO.    : 6,503,546 B1  
DATED         : January 7, 2003  
INVENTOR(S)   : Ferrari-Philippe et al.

It is certified that error appears in the above-identified patent and that said Letters Patent is hereby corrected as shown below:

Column 6,  
Line 33, change "where-fin" to -- wherein --.

Column 8,  
Line 33, change "0.64" to -- 0.04 --.

Signed and Sealed this

Twenty-ninth Day of April, 2003

JAMES E. ROGAN  
*Director of the United States Patent and Trademark Office*